(12) United States Patent
Jones et al.

(10) Patent No.: US 6,439,751 B1
(45) Date of Patent: Aug. 27, 2002

(54) METHOD AND SYSTEM FOR PROVIDING A RELIABLE AND DURABLE LIGHT SOURCE

(75) Inventors: Mike I. Jones, Azle; Harold W. Carter; Donald Allen Streater, Jr., both of Fort Worth; T. Shannon Hunter, Azle, all of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/398,620

(22) Filed: Sep. 17, 1999

(51) Int. Cl.[7] .............................. B64D 47/02; G02B 6/42
(52) U.S. Cl. ...................... 362/470; 362/511; 362/556; 362/583; 385/115; 385/901
(58) Field of Search ................................ 362/551, 554, 362/556, 559, 565, 581, 583, 470, 293, 511; 385/115, 116, 901

(56) References Cited

U.S. PATENT DOCUMENTS

| | | | | |
|---|---|---|---|---|
| 3,847,696 A | * | 11/1974 | Ortner et al. ................ | 385/116 |
| 3,853,658 A | * | 12/1974 | Ney ............................ | 385/116 |
| 3,872,236 A | * | 3/1975 | Swengel, Sr. et al. ...... | 385/147 |
| 3,933,409 A | * | 1/1976 | Kloots ........................ | 385/115 |
| 3,963,920 A | * | 6/1976 | Palmer ........................ | 385/89 |
| 4,082,421 A | * | 4/1978 | Auracher et al. ............ | 385/66 |
| 4,422,714 A | * | 12/1983 | Benoit et al. ................ | 385/39 |
| 5,283,852 A | * | 2/1994 | Gibler et al. ............... | 385/136 |
| 6,201,915 B1 | * | 3/2001 | Rizkin et al. ............... | 385/115 |

FOREIGN PATENT DOCUMENTS

| | | |
|---|---|---|
| DE | 24 07 451 | 8/1975 |
| DE | 85 09 173 | 7/1986 |
| DE | 38 03 451 | 8/1989 |
| DE | 41 19 975 | 12/1992 |
| EP | 0 340 463 | 11/1989 |

OTHER PUBLICATIONS

International Search Report dated Dec. 22, 2000, PCT/US00/25495.

* cited by examiner

Primary Examiner—Alan Cariaso
(74) Attorney, Agent, or Firm—Hughes & Luce LLP

(57) ABSTRACT

The present invention provides an exterior skin for a vehicle that includes angularly distributed, individual, fiber-optic elements formed into the exterior skin of a composite, metal, or other material matrix. The vehicle exterior lighting system includes a central light source for providing optical energy of a desired luminescence. A plurality of optical channels of the lighting system transmit the optical energy and are formed from an optically conductive material. The optically conductive material associates through the outer skin of the structural material. The optical channels include terminating ends of the optically conductive material and are essentially flush with the outer skin of the structural material. This permits transmitting the optical energy through the structural material. The invention also includes means for transmitting the optical energy from the central light source to the optical channels. This allows the optical channels to distribute the optical energy from the structural material in the desired directions and at desired intensity levels.

36 Claims, 4 Drawing Sheets

METHOD AND SYSTEM FOR PROVIDING A RELIABLE AND DURABLE LIGHT SOURCE

TECHNICAL FIELD OF THE INVENTION

The present invention relates generally to light sources and their methods of operation and formation and, more particularly, to a method and system for providing a durable and reliable light source. Even more particularly, the present invention relates to a light source for use in providing exterior lighting from structures such as the exterior structure of aircraft or other vehicles. The present invention has particular application in providing indication, signaling, marking, and illumination lighting for vehicles, while avoiding the need for exterior lenses or other exterior structures or components.

BACKGROUND OF THE INVENTION (U/VTR) Exterior aircraft lighting systems pose some unique challenges for producers of lighting that must comply with military and federal aircraft lighting requirements. Limitations associated with prior art systems that include a lens configuration relate to the durability of the lens materials. Conventional lens materials for aircraft are resistant to cleaning at the beginning of their lifetime but can be adversely and cumulatively affected by sand and incorrectly performed abrasive cleaning.

Another consideration for aircraft navigation lights encompasses maintenance actions such as bulb replacement. Frequent removal and replacement of conventional light fixtures and integration materials are unacceptable from cost and readiness viewpoints.

There is the need, therefore, for a method and system for exterior vehicle lighting surfaces that are smooth and continuous.

There is a further need for a method and system for an improved lighting system permitting the highest design and fabrication standards to be employed while integrating the light fixture into the airframe or test body.

There is also the need for a method and system for integrating a light fixture that is highly durable in normal use in exterior lighting.

SUMMARY OF THE INVENTION

The present invention provides an exterior lighting method and system for vehicles, including aircraft usable in military scenarios. The present invention provides an exterior skin for a vehicle that includes angularly distributed, individual, fiber-optic elements formed into the exterior skin of a composite, metal, or other material matrix, that eliminates or substantially reduces limitations and problems relating to known methods and systems for providing the exterior lighting functions for vehicles.

According to one aspect of the present invention, there is provided a vehicle exterior lighting system for transmitting light through a structural material. The vehicle exterior lighting system includes a central light source for providing optical energy of a desired luminescence. A plurality of optical channels of the lighting system transmit the optical energy and are formed from an optically conductive material. The optically conductive material associates through the outer skin of the structural material. The optical channels include terminating ends of the optically conductive material and are essentially flush with the outer skin of the structural material. This permits transmitting the optical energy through the structural material. The invention also includes means for transmitting the optical energy from the central light source to the optical channels. This allows the optical channels to distribute the optical energy from the structural material in the desired directions and at desired intensity levels.

The present invention may be made by applying several conventional manufacturing methods, including die casting, electroless plating, electroforming, and powder metal techniques.

The present invention takes advantage of conical spreading of light through the use of surface-terminated fiber optics. to project light into a large solid angle of field coverage from the exterior skin of an object for providing appropriately distributed light for a variety of applications such as military aircraft. With the present invention, light pipes and fiber optics transport light from centrally located, easily accessible light sources, such as light bulbs, laser-emitting diodes, or various laser devices, to the distribution elements mounted on the outer mold line of the platform. This also has the benefit of reducing the life cycle costs by combining fiber optics and light pipe technology with durable surface features.

A further advantage of the system obtainable because of the present invention is the extreme durability of the skin-mounted unit and the ease of replacing the readily accessible light sources. Low life cycle cost is also a major benefit of the system of the present invention. The low risk associated with the present invention and its methods of production enable integrating the present invention into all current and future product development programs requiring exterior lighting.

One of the main benefits is the durability of a lighting system employing the concepts of the present invention. Such a system possesses the durability equivalent to or superior to that of the exterior composite materials that form the vehicle skin. Fibers terminate at the skin and are cast and terminated in a bundle behind the skin.

The present invention provides an exterior lighting system that is essentially impervious to rain erosion. Prior art lens coatings such as ITO typically degrade from rain erosion. With the present invention, there is no ITO coating required, so no coating rain erosion can occur.

For non-military applications, the present invention provides a novel approach to lighting applications such as interior lighting panels, durable exterior automobile lighting, and retail signage. An interesting application may be to cast license plates into alphanumeric shapes for easy recognition.

BRIEF DESCRIPTION OF THE DRAWINGS

For a complete understanding of the invention, reference is made to the following Detailed Description of the Invention, which describes the preferred embodiment aspects of which are illustrated in the accompanying drawings, where.

DETAILED DESCRIPTION OF THE INVENTION

Figure 1:
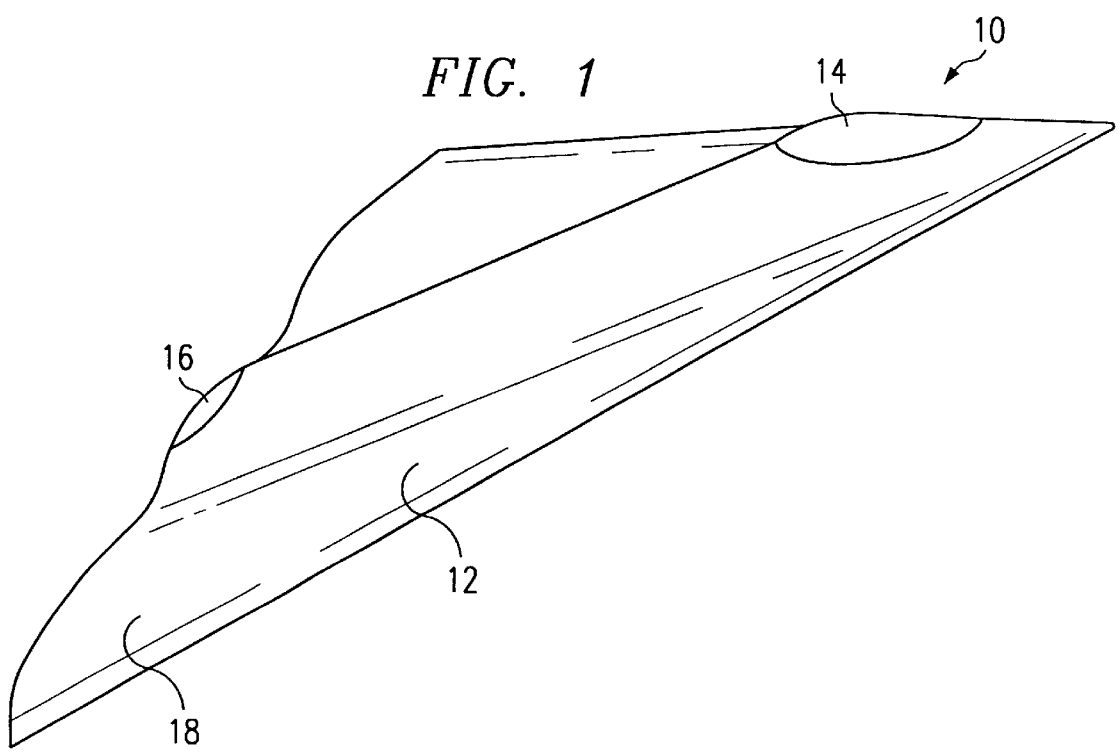
FIG. 1 gives a conceptual view of an aircraft employing the exterior lighting system of the present invention.

FIG. 1 is a conceptual depiction of an aircraft 10 employing an external lighting system 12 according to the teachings of the present invention. Aircraft 10, as FIG. 1 depicts, includes cockpit windshield 14, engine exhaust 16, and various airfoil joints and surfaces 18. However, no external discontinuous or apparent lenses are on the aircraft 10 surface. This is possible because the external lighting system made possible by the present invention requires no external lenses, coatings or other surface anomalies to provide the needed level of exterior lighting for vehicle vision, indication, or other navigational and identification purposes.

Figure 2:
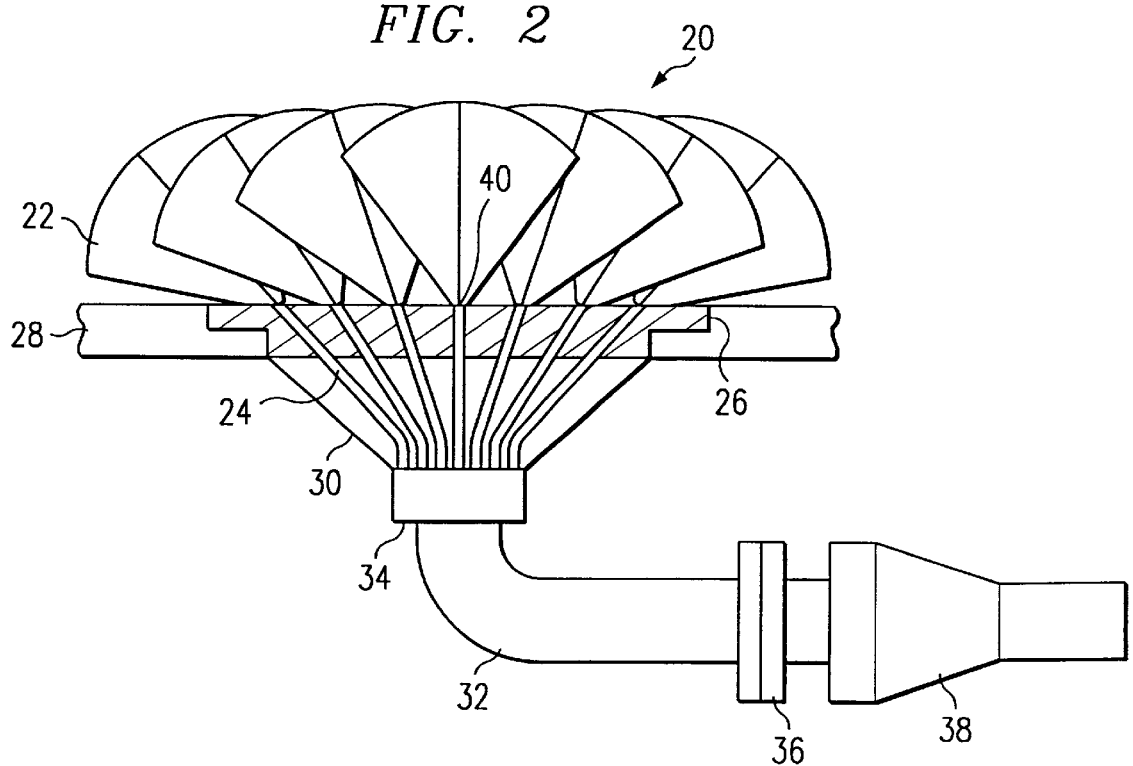
FIG. 2 shows a cross section of fiber-embedded metallic skins employing the concepts of the present invention.

FIG. 2 shows a cross section of fiber-embedded metallic skin system 20 employing the concepts of the present invention. In FIG. 2, fiber-embedded metallic skin system 20 has the ability to produce light emissions 22 from each of optical fibers 24 passing through skin casting 26. Skin casting 26 may be formed to associate flush with exterior skin 28. Optical fibers 24 may be positioned at varying angles in epoxy casting 30 and then through skin casting 26 and to optically connect with fiber optic light pipe 32 via optical coupler 34. Fiber optic light pipe 32 receives light through optional light filters 36 that remote light source 38 projects.

Exterior lighting system 20, therefore, has the ability to transmit light emissions 22 through a structural or skin material, such as skin casting 26. In exterior lighting system 20, remote light source 38 serves as a central light source for providing optical energy of a desired luminescence. Remote light source 38, together with the optical light filters 36, light pipe 32 and optical fibers 24 control the degree of luminescence achievable by light emissions 22 and form a set of optical channels.

The terminating ends 40 of optic fibers 34 are essentially flush with outer skin of the skin casting 26, which serves as a structural material for holding optical fibers 24. The result is a distribution of light emissions 22 that distributes optical energy from the skin casting 26 in the directions established by the positioning of the optical fibers within skin casting and at the luminescence or intensity levels established by the optical channel delivering the optical energy to terminating ends 40.

With the present invention, there is low cost associated with the concept and the mature manufacturing methods to be used. These technical advantages permit the use and implementation of the system of the present invention in short development cycle vehicle development programs.

Figure 3:
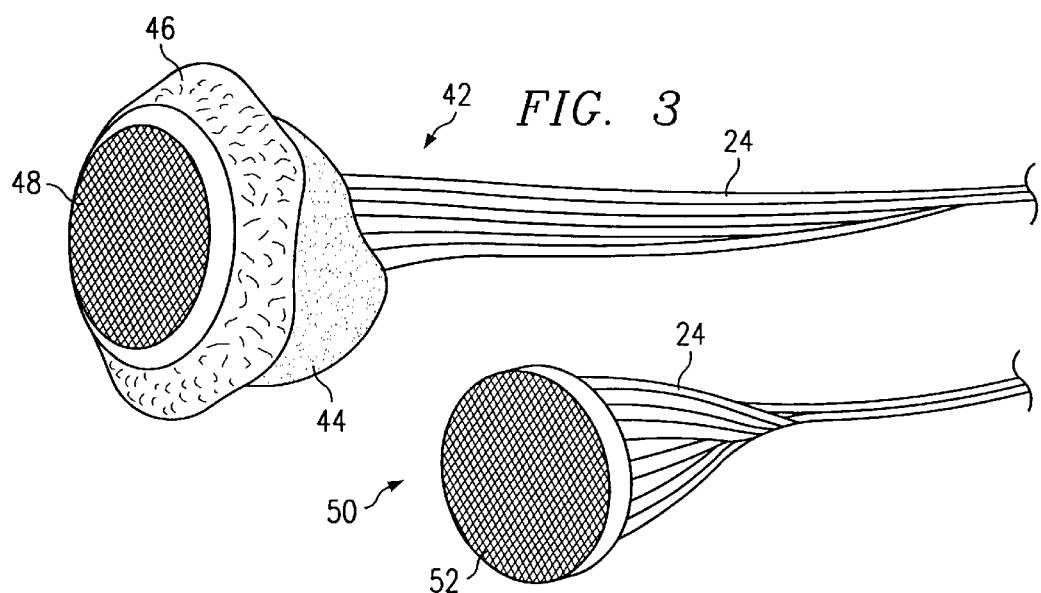
FIG. 3 illustrates a metallic and polymer laboratory test articles using the teachings of the present invention.

FIG. 3 illustrates metallic and polymer laboratory test articles using the teachings of the present invention. Metallic test article 42 shows optical fibers 24 supported within epoxy casting 44 and integral with aluminum skin casting 46. Exterior face 48, including the ends of optical fibers 24 passing through aluminum skin casting 46, is optically polished flat to allow light to freely enter or exit optical fibers 24. Likewise, polymer test article 50 receives optical fibers 24 that pass through polymer base 52 and terminate in the optically polished exterior surface. Both metallic test article 42 and polymer test article 50 have the potential for achieving the results depicted in FIG. 2 for exterior lighting system 20.

One embodiment of the present invention uses an efficient, fiber-optic approach that results in tiny (approx. 240 micron diameter) holes in a rigid composite structure. Also, as opposed to the use of optical fibers, the purposes of the present invention may be achieved by passing light through small openings in highly conductive material. Other embodiments of the present invention may include the use of either the naturally occurring openings in a conductive fabric or the space between tiny metal springs to pass light through a retractable, transparent membrane.

The preferred embodiment of the present invention, however, uses a fiber-optic composite skin material in which arrays of optical fibers pass directly through a conductive metal skin. The fibers are arranged at selected angles relative to the outer mold line surface to provide the requisite angular coverage with minimum above-mold-line exposure. Unless a colored light source, such as an light emitting diode or laser device is used, the light source will be color-filtered as required for the particular application.

The present invention may be manufactured in a variety of ways, beginning with the selection of light sources and the needs for the numerical aperture of the individual fibers. The numerical aperture determines the existing light cone angle. Additional considerations include the expected light output per fiber, required light distribution, and sufficient fiber redundancy to accommodate anticipated breakage. In forming the present invention a defined structure is formed of a material to which the optical fibers are inert. The material should have a first melting point lower melting point than the optical fibers so they can pass through the defined structure without physical damage to the fibers.

An exterior lighting system employing the concepts of the present invention may be manufactured in numerous ways, including casting (such as in sand casting aluminum or a forming a polymer resin to hold the fibers), powdered metal forming, or electro-forming. In such articles, the outer metal surfaces of the casting and the protruding fibers may be ground and polished smoothly. External ends of the fibers need not be polished to high optical quality because a certain amount of light scatter is desirable. The interior fiber ends, however, must be highly optically polished to maximize light coupling efficiency.

Because the coefficient of expansion of the molding metal is several times higher than that of the glass or the silica fibers, the fibers are tightly captured upon cooling. The fibers do not suffer compression fracturing during cooling due to their high compression strength. This eliminates rain leakage and eliminates fiber slippage and dirt-collecting cavities.

The present invention may use either small single-mode fibers or multimode glass or fused silica fibers having diameters of approximately 100–200 $\mu$m (micrometers). The visual appearance at close range is that of a luminous halftone screen. An alternative manufacturing method for the present invention employs electro-forming or plating of a nonmetallic structural skin. For the plating approach, a non-metallic substrate similar to the polymer test article is used. The coefficient of expansion of the polymer casting material is more closely matched to the coefficient of expansion of the optical fiber. The optical fibers are tightly adhered in the polymer casting and do not leak or slip. After the skin is cast and the optical fibers are placed, the entire outer surface, its protruding optical fiber stubble, and the mating edges of the skin are plated by conventional methods to produce a highly conductive surface. The exterior surface is then optically smoothed and polished.

If 240-micron fibers are spaced 11 diameters apart (20 diameters between the hole edges), approximately 20,000 fibers will be present in a 6-in. by 6-in. square. If intensity recommendations of SAE AR 991 are satisfied, it can be estimated that a total luminous flux of approximately 53 lumens is needed to fulfill the recommendations. Therefore, an exit luminance of approximately 0.0053 lumens per fiber is required to meet SAE AR 991B navigation light recommendations with 20,000 fibers. To allow for 20% fiber loss to breakage, the preferred embodiment might include 0.0064 lumens per fiber, which is easily achievable.

Figure 4:
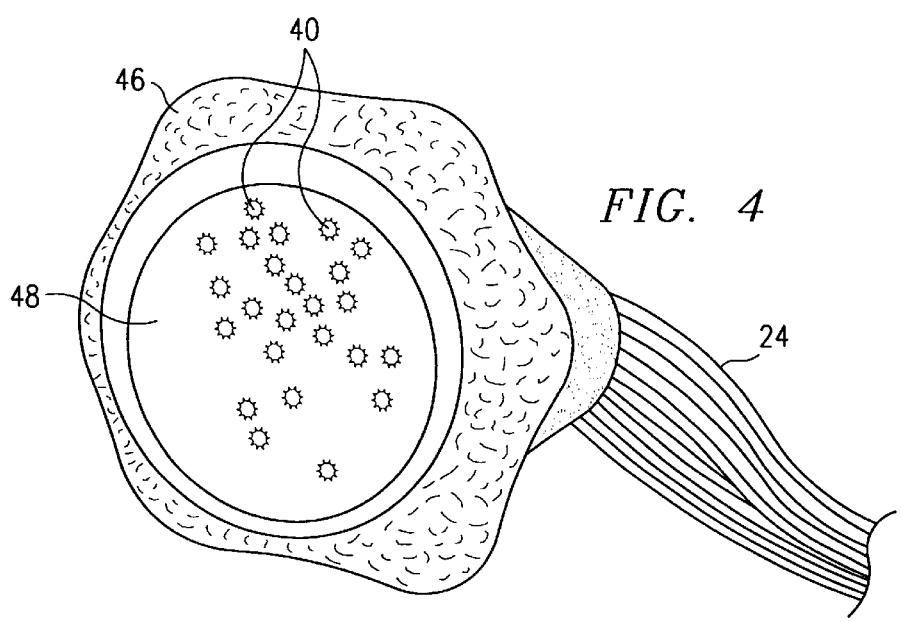
FIG. 4 provides a head-on view of a fiber-embedded metallic skin of the present invention.

FIG. 4 provides a head-on view of a fiber-embedded metallic test article 42 of FIG. 3 to show the light distribution made possible by the present invention. As FIG. 4 shows, light shines brightly from terminating ends 40 of optical fibers 24. The varying intensities of the different points of light 40 due to different orientations and directions of optical fibers 24 in test article 42 demonstrate the principle illustrated in FIG. 2 of producing light over a large solid angle of coverage by tilting the fibers 24 at their terminations. These orientations may be controlled as desired during the fabrication of an exterior lighting system 12 in FIG. 1 incorporating the teachings of the present invention.

Figure 5:
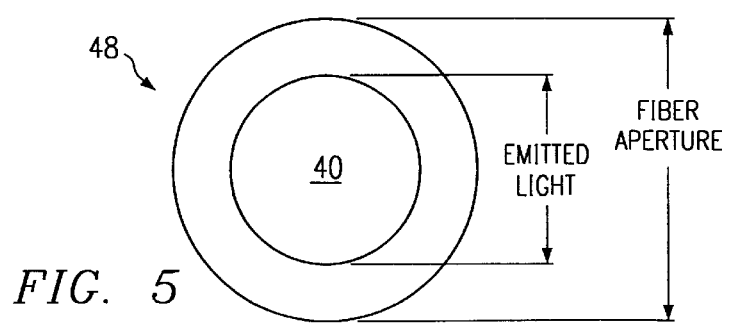
FIG. 5 illustrates the capture and termination of an optical fiber in a casting, such as an aluminum casting.

FIG. 5 provides an enlarged view of a single terminating end 40 of an optical fiber formed within exterior surface 48 of metallic test article 46. The luminescence capable at terminating end 40 is very bright and can clearly achieve the requirements for a variety of applications such as for navigation lights, indication lights, directed energy and other applications of importance for vehicle applications.

Figure 6:
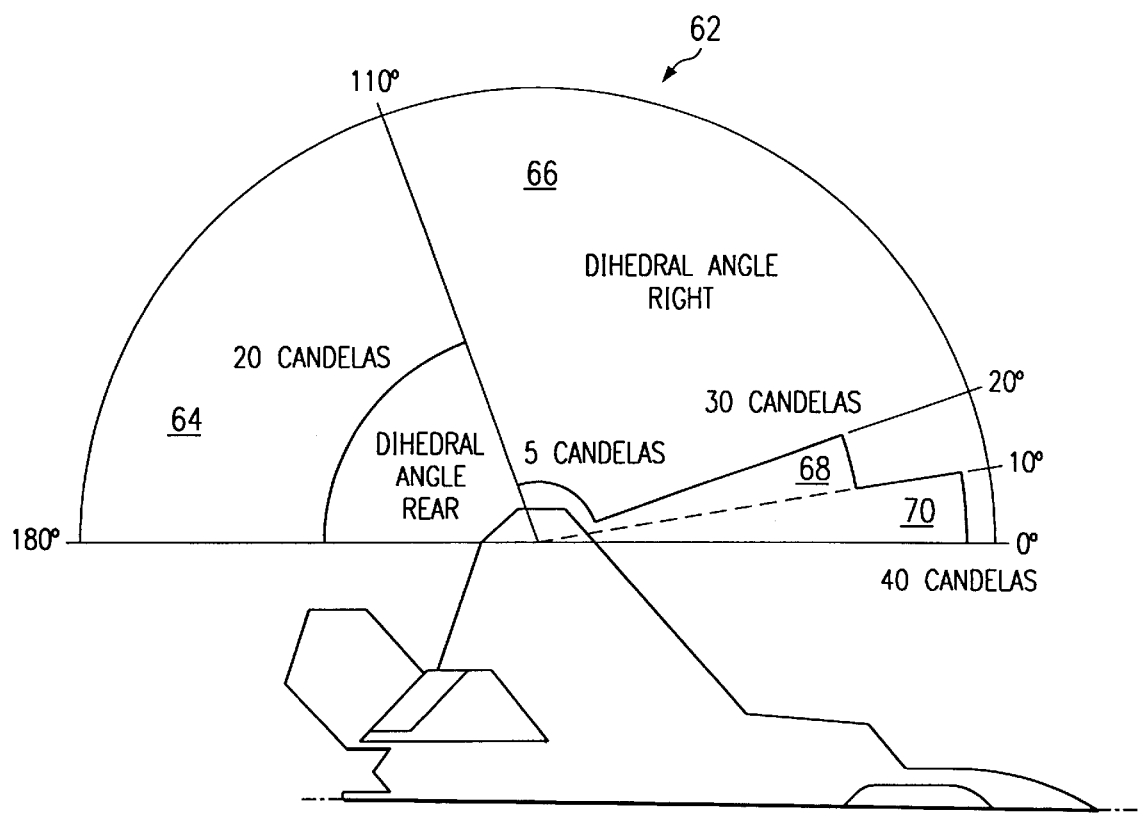
FIGS. 6 and 7 show a navigation light intensity distribution for one embodiment of the present invention.
Figure 7:
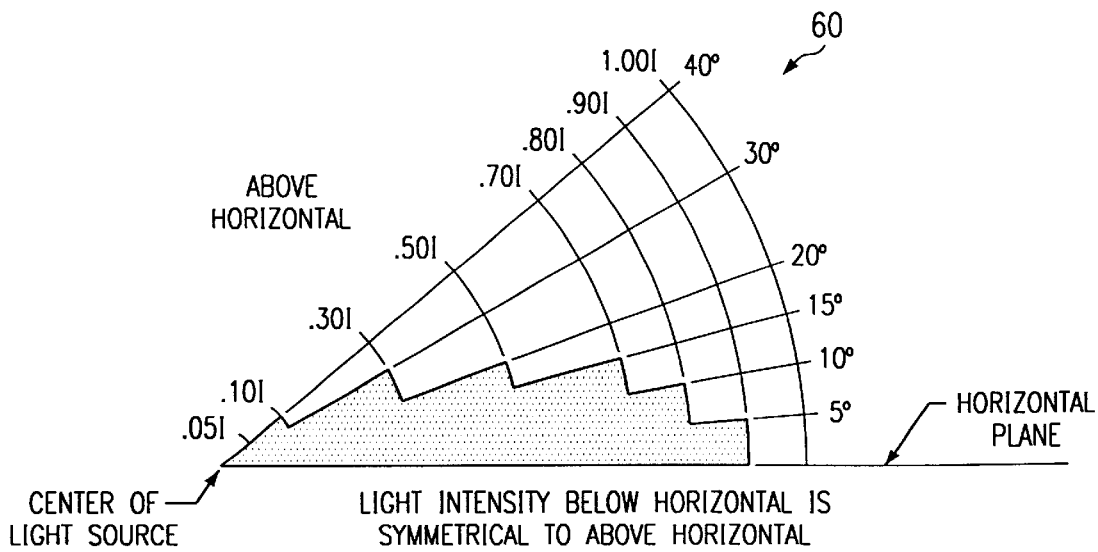

FIG. 6, therefore, shows the use of an exterior lighting system 12 as a navigation light intensity distribution. Light intensity distribution graph 60 of FIG. 6 shows that the light intensity below the horizontal plane is symmetrical to that above the horizontal plane. FIG. 7 further describes luminescence distribution 62 for aircraft 10. In region 64, a luminescence of 20 candles is needed at azimuthal angles of between 110 and 180 degrees. In region 66, azimuthal angles between 110 degrees and 20 degrees need 5 candles of luminescence. Region 68 needs a luminescence of 30 candles between 20 and 10 azimuthal degrees. Region 70 needs a luminescence of 40 candles between 10 and 0 azimuthal degrees. These levels can be achieved by the exterior lighting system 12 of the present invention by properly orienting light-emitting fiber optic skin panels 20.

Navigation and anti-collision lights are critical to aircraft safety. They provide crews of other aircraft with essential visual data. Red(port), green (starboard), and white (tail) navigation lights show the aircraft's heading relative to an observer. Bright, flashing anti-collision lights warn others that an aircraft is present. Formation lights are intended to provide visual, unambiguous orientation information regarding the attitude and position of the lead aircraft.

Minimum requirements and design goals are documented in many aircraft exterior illumination standards. The luminescence requirements for various military or aviation applications suggest the use of lasers or light emitting diodes as central light sources, due principally to their overall higher efficiency. Tungsten-halogen or arc lamps may, however, be useful for different applications with appropriate color filtering.

In addition to providing the correct colors, navigation and anticollision lights must meet intensity distribution specifications. Since traditional military specifications either have been canceled or do not apply to new aircraft, compliance with Federal Aviation Regulations (FAR) and Society of Automotive Engineers (SAE) standards is required. These and other regulations provide a basis for developing specifications for various aircraft programs. These considerations include requirements for the angular distribution of minimum intensity for the aircraft's position and navigation lights, as well as the angular distribution of minimum intensity for aircraft anti-collision lights.

Figure 8:
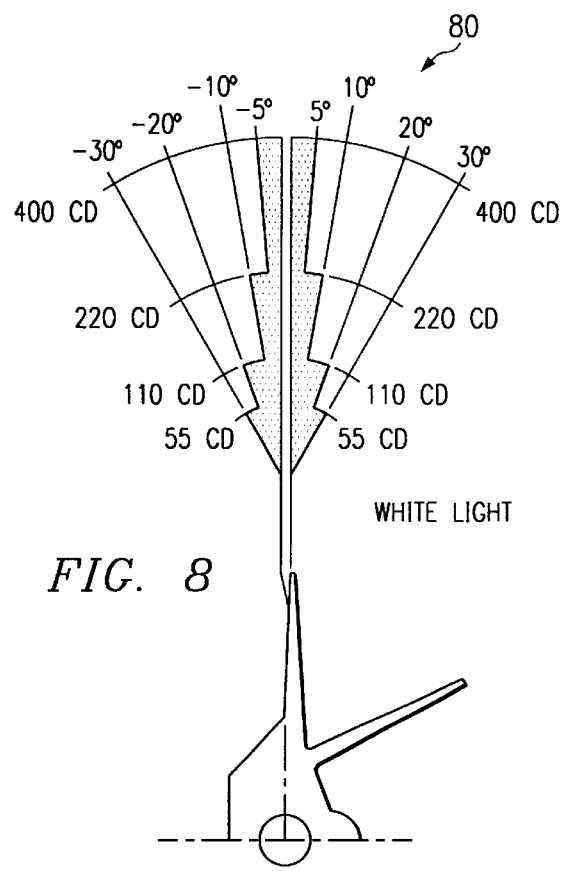
FIGS. 8 and 9 give an anti-collision light intensity distribution for which the present invention produces exterior lighting.
Figure 9:
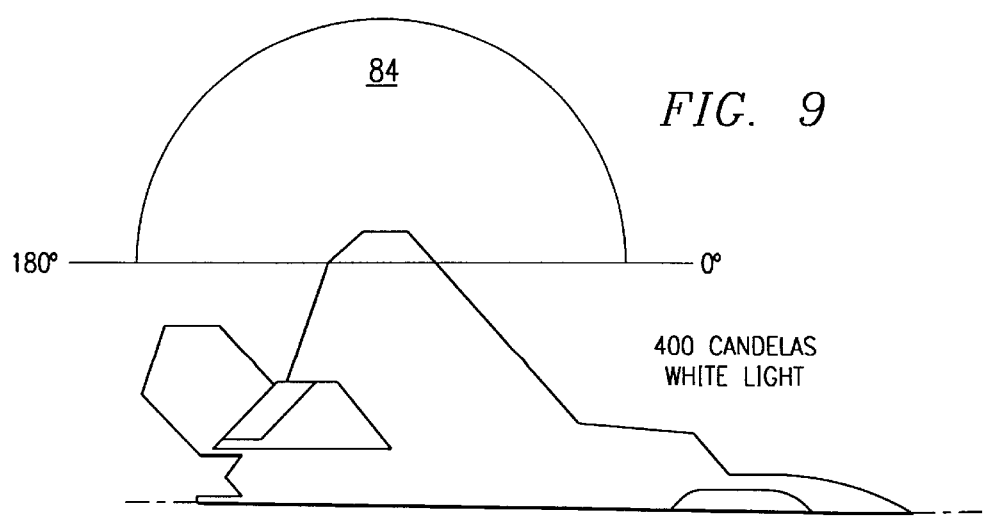

FIG. 8 gives an anti-collision light intensity distribution for which the present invention produces exterior lighting. Light intensity distribution graph 80 of FIG. 8 shows the light intensity above the horizontal to require a luminescence of 400 candles between +5 and −5 degrees. A luminescence of at least 220 candles is required between +10 and 10 degrees. Between +20 and −20 degrees a luminescence of at least 110 candles is necessary. The side view of aircraft 10 in FIG. 9 further shows region 84 ranging from 0 to 180 degrees vertically requires a luminescence of 400 candles.

A 20,000-fiber, anti-collision light requires approximately 0.065 lumens per fiber to produce 400 candles (SAE AS 8017A) or 0.196 lumens per fiber for 1,200 candles (SAE AR 991B). These numbers include a 20% allowance for fiber breakage and other losses.

Light distribution is an important consideration of the present invention. optical fibers emit cones of light, and the half-angle of a typical fiber is greater than 30 degrees. In addition, the emitted pattern will be broadened by tilting the fibers away from perpendicular to the moldline surface. other aids are available to mitigate any distribution limitations that might adversely affect performance of the present invention. Location selection on a particular aircraft, installation of multiple lights, or providing a slight protrusion above the mold line may help achieve optimal light distribution.

Although the above provides an enabling description of the critical aspects of present invention, including various preferred and alternative embodiments, the scope of the invention should be interpreted only by the following claims.

What is claimed is:

1. A vehicle exterior lighting system comprising:
   a central light source located within said vehicle to provide optical energy;
   one or more optical channels, wherein said optical channels are optically coupled to said central light source and carry said optical energy;
   a terminating end of each of said one or more optical channels; and
   one or more casting systems, one each coupled to an exterior skin of said vehicle and to one of said terminating ends of said one or more optical channels, for transmitting said optical energy through said exterior skin of said vehicle.

2. The exterior lighting system of claim 1, wherein at least one of said one or more casting systems for transmitting said optical energy through said exterior skin of said vehicle comprises:
   surface terminated fiber optics flush with said exterior skin of said vehicle that project said optical energy in a field extending from said exterior skin at said vehicle.

3. The exterior lighting system of claim 2, wherein said field is a conical field.

4. The exterior lighting system of claim 1, wherein said vehicle is an aircraft.

5. The exterior lighting system of claim 1, wherein at least one of said one or more casting systems for transmitting said optical energy through said exterior skin of said vehicle comprises a fiber embedded metallic skin casting wherein fibers embedded in said metallic skin casting conduct said optical energy.

6. The exterior lighting system of claim 1, wherein at least one of said one or more casting systems for transmitting said optical energy through said exterior skin of said vehicle comprises:

a plurality of optically conductive fibers embedded in a casting; and an optical coupler to couple said one of said terminating ends of said one or more optical channels to said plurality of optically conductive fibers, wherein said fibers pass said optical energy into a field extending from said exterior skin of said vehicle.

7. The exterior lighting system of claim 6, wherein said plurality of fibers are positioned at a plurality of angles.

8. The exterior lighting system of claim 6, wherein said casting is metallic.

9. The exterior lighting system of claim 6, wherein said casting comprises a polymer.

10. The exterior lighting system of claim 6, wherein said casting comprises a composite structure.

11. The exterior lighting system of claim 1, wherein at least one of said one or more casting systems for transmitting said optical energy through said exterior skin of said vehicle comprises a fabric conductive to pass optical energy through a plurality of openings.

12. The exterior lighting system of claim 1, further comprising:

a color-filtering system optically coupled to at least one of said one or more optical channels to color-filter said optical energy.

13. The exterior lighting system of claim 6, wherein said optically conductive fibers have a coefficient of expansion less than a coefficient of expansion of said casting.

14. The exterior lighting system of claim 6, wherein said optically conductive fibers have a diameter between 100 and 200 μm (micrometers).

15. The exterior lighting system of claim 1, wherein said one or more casting systems are cast to conform to said structure.

16. The exterior lighting system of claim 1, wherein said one or more casting systems are cast aluminum.

17. A method for illuminating an exterior skin of a vehicle comprising the steps of:

providing optical energy from a central light source;

coupling an optical channel to said central light source;

coupling a terminating end of said optical channel to a casting system coupled to and extending through said exterior skin; and projecting said optical energy from said casting system in a field extending from said exterior skin of the vehicle.

18. The method of claim 17, wherein said step of projecting said optical energy from said exterior skin of the vehicle further comprises projecting said optical energy in a conical field.

19. The method of claim 17, further comprising:

conducting said optical energy through said exterior skin via said casting system.

20. The method of claim 17, further comprising the step of:

color-filtering said optical energy.

21. The method of claim 18, further comprising the step of:

passing said optical energy through said exterior skin, wherein said casting system comprises a fabric conductive to pass optical energy through a plurality of openings.

22. The method of claim 17, wherein said casting system comprises:

a plurality of optically conductive fibers embedded in and extending through one or more castings coupled together such that the optical path of said optically conductive fibers is preserved; and an optical coupler to couple said terminating end of said optical channel to said plurality of optically conductive fibers, wherein said fibers pass said optical energy into a field extending from said exterior skin.

23. The method of claim 22, wherein said one or more castings comprise a skin casting, formed to associate flush with said exterior skin, and a second casting coupled between said skin casting and said optical coupler.

24. The method of claim 23, wherein said skin casting is cast aluminum and wherein said second casting comprises epoxy.

25. The method of claim 23, wherein said plurality of optically conductive fibers are terminated at said skin casting flush with the outer skin of said skin casting, and wherein said plurality of optically conductive fibers are operable to project said optical energy from said optical channel in a field extending from said exterior skin of said vehicle.

26. A lighting system comprising:

a light source to provide optical energy;

an optical channel, wherein said optical channel is optically coupled to said light source and conducts said optical energy;

a terminating end of said optical channel; and a casting system, coupled to said terminating end of said optical channel, for transmitting said optical energy from said optical channel and projecting it into a field for illumination, wherein said casting system comprises a plurality of optically conductive fibers embedded in and extending through one or more castings coupled together such that the optical path of said optically conductive fibers is preserved, wherein said one or more castings comprises a skin casting, formed to associate flush with an exterior skin of a structure.

27. The system of claim 26, further comprising an optical coupler to couple said terminating end of said optical channel to said plurality of optically conductive fibers.

28. A lighting system comprising:

a light source to provide optical energy;

an optical channel, wherein said optical channel is optically coupled to said light source and conducts said optical energy;

a terminating end of said optical channel; and a casting system, coupled to said terminating end of said optical channel, for transmitting said optical energy from said optical channel and projecting it into a field for illumination, wherein said casting system comprises a plurality of optically, conductive fibers embedded in and extending through one or more castings coupled together such that the optical path of said optically conductive fibers is preserved, wherein said one or more castings comprise a skin casting, formed to associate flush with an exterior skin of a structure, and a second casting coupled between said skin casting and said optical channel.

29. The system of claim 28, wherein said skin casting is cast aluminum and wherein said second casting comprises epoxy.

30. The system of claim 28, wherein said plurality of optically conductive fibers are terminated at said skin casting flush with the outer skin of said skin casting, and wherein said plurality of optically conductive fibers are operable to project said optical energy from said optical channel in a field extending from said exterior skin.

31. A method for manufacturing a fiber-optic lighting system, comprising the steps of:
- casting a plurality of optically conductive fibers in a molding material, wherein said optically conductive fibers have a coefficient of expansion less than that of said molding material such that said fibers are tightly captured by said molding material upon cooling, wherein said molding material is cast in a shape such as to associate flush with an exterior surface of a mounting structure;
- grinding and polishing smoothly one or more protruding ends of said optically conductive fibers on one side of said cast molding material, such that said protruding ends are flush with said cast molding material; and
- optically polishing the other ends of said plurality of optically conductive fibers.

32. The method of claim 31, wherein said mounting structure is an aircraft.

33. A method for manufacturing a fiber-optic lighting system, comprising the steps of:
- casting a plurality of optically conductive fibers in a molding material, the molding material having a first surface and a second surface when molded, wherein said optically conductive fibers have a coefficient of expansion less than that of said molding material such that said fibers are tightly captured by said molding material upon cooling, the optically conductive fibers entering the molding material the first surface and exiting on the second surface;
- grinding and polishing smoothly one or more protruding ends of said optically conductive fibers on one side of said cast molding material, such that said protruding ends are flush with said cast molding material; and
- optically polishing the other ends of said plurality of optically conductive fibers.

34. The method of claim 33, further comprising the step of coupling said optically polished ends of said optically conductive fibers to an optical channel or light source.

35. The method of claim 33, wherein said molding material is a metal.

36. The method of claim 35, wherein said metal is aluminum.

* * * * *